US007048246B2

(12) United States Patent
Leyden et al.

(10) Patent No.: US 7,048,246 B2
(45) Date of Patent: May 23, 2006

(54) UNIVERSAL CAMERA MOUNT

(75) Inventors: Roger J. Leyden, Willow Springs, IL (US); Peter J. Passuntino, Wheaton, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 0 days.

(21) Appl. No.: 10/016,574

(22) Filed: Dec. 7, 2001

(65) Prior Publication Data

US 2003/0106971 A1 Jun. 12, 2003

(51) Int. Cl.
*F16M 13/00* (2006.01)

(52) U.S. Cl. .............. 248/551; 248/187.1; 248/220.31; 340/568.1

(58) Field of Classification Search ............. 248/187.1, 248/205.3, 220.31, 904, 551; 340/568.1, 340/568.2, 568.8, 687, 691, 693.9, 571, 572.9; 396/419, 422, 428, FOR. 913
See application file for complete search history.

(56) References Cited

U.S. PATENT DOCUMENTS 3,850,392 A * 11/1974 Gassaway .................... 248/553
3,893,095 A * 7/1975 DeJong ........................ 169/23
4,066,231 A * 1/1978 Bahner et al. .............. 248/552
4,274,088 A * 6/1981 Pierson et al. ........... 340/568.8
4,329,681 A 5/1982 Parsons
4,615,597 A * 10/1986 Burriss ..................... 248/183.1
4,709,897 A * 12/1987 Mooney ...................... 248/551
4,772,878 A 9/1988 Kane
4,837,835 A 6/1989 Murayama
4,899,189 A 2/1990 Frost
5,039,050 A * 8/1991 Eidschun et al. ........ 248/279.1
5,137,238 A * 8/1992 Hutten .................... 248/206.3
5,146,205 A * 9/1992 Keifer et al. ............... 340/540
5,172,098 A * 12/1992 Leyden et al. ........... 340/568.2
5,196,827 A 3/1993 Allen et al.
5,241,297 A * 8/1993 Goodman ................... 200/287
5,341,124 A * 8/1994 Leyden et al. ........... 340/568.4
5,421,667 A * 6/1995 Leyden et al. .............. 403/300
5,444,507 A * 8/1995 Palmer ....................... 396/421
5,446,252 A * 8/1995 Burger ........................ 200/18
5,565,848 A * 10/1996 Leyden et al. ........... 340/568.2
5,574,430 A * 11/1996 Ott et al. .................... 340/566
5,684,467 A 11/1997 Hur
5,737,657 A * 4/1998 Paddock et al. ............ 396/428
5,805,071 A 9/1998 Hur
5,810,313 A 9/1998 Armstrong
5,861,807 A * 1/1999 Leyden et al. ........... 340/568.2
5,886,633 A * 3/1999 Adams ..................... 340/568.3
6,015,123 A 1/2000 Perez et al.
6,027,277 A * 2/2000 Leyden et al. .............. 403/291
6,039,498 A 3/2000 Leyden et al.
6,042,080 A 3/2000 Shepherd et al.
6,087,939 A * 7/2000 Leyden et al. ........... 340/568.2

(Continued)

*Primary Examiner*—Korie Chan
(74) *Attorney, Agent, or Firm*—Greenberg Traurig

(57) ABSTRACT

The present invention is directed to camera mounting systems and, in particular, a universal camera mount apparatus incorporating a security device for use in theft prevention. The apparatus comprises an electronic anti-theft assembly in combination with a universally mountable mounting member. The universally mountable mounting member may then be secured to a camera by a fastener threaded into the camera's pre-existing tripod mount hole, for monitoring by the security device. As the majority of cameras manufactured incorporate tripod mounting holes, the mounting member may be used with the majority of today's cameras, regardless of shape, by providing alternative apertures for mounting in at least two intersecting directions of orientation.

20 Claims, 4 Drawing Sheets

U.S. PATENT DOCUMENTS 6,123,306 A * 9/2000 Jackson .................. 248/296.1
6,380,855 B1 * 4/2002 Ott .......................... 340/568.1
6,761,579 B1 * 7/2004 Fort et al. .................. 439/501
2003/0128118 A1 * 7/2003 Leyden et al. ........... 340/568.2

* cited by examiner

UNIVERSAL CAMERA MOUNT

BACKGROUND OF THE INVENTION

1. Field of the Invention

The present invention is directed to camera mounting systems and, in particular, a camera mount apparatus incorporating a security device for use in theft prevention.

2. Background Art

Product displays in consumer electronic stores often incorporate security systems that simultaneously allow consumers to examine and test fully functioning consumer electronic products without exposing the store owner to a risk of theft. Such security systems may simply involve attaching a retractable tether from the consumer display to the consumer electronic product. More advanced systems may also incorporate an electronic alarm system that alerts store personnel in the event the tether becomes disconnected either from the product or from the product display.

Handheld cameras are ubiquitous in most, if not all, consumer electronic stores. A great majority of cameras today, including both still and video cameras, incorporate a number of features to distinguish one product over another. Because of this, consumers prefer to handle and manipulate a camera, prior to purchase, to determine if the features embodied in a particular model are suitable for the consumer's intended use. It is no coincidence, therefore, that thieves are particularly attracted to stealing handheld cameras because the devices are easily accessible, expensive and portable. In response, store owners typically attach an electronic anti-theft device along with a tether to the cameras on display.

Attaching anti-theft devices and/or tethers to cameras is not without difficulty. For example, cameras are often so small that a dedicated portion of the camera for attachment of an anti-theft device doesn't exist. On the other hand, larger cameras have more surface area available to attach an anti-theft device using traditional means of industrial strength double-sided adhesive tape, but the surfaces of modern camera housings are often so curved that effective attachment of an anti-theft device is questionable. Surely the solution to these problems might include: (1) reducing the "footprint" of the anti-theft device to either fit a smaller camera or to minimize the effect of the housing contours on a larger camera, or (2) for larger cameras, designing and fabricating anti-theft devices that better match the contours of each individual camera model.

Unfortunately, taking either of these avenues presents new problems. First, anti-theft devices attached using double-sided adhesive tape to cameras depend on maximum surface area contact to ensure a sufficient resistive force to thwart potential thieves. Therefore, reducing the size of the anti-theft device negates this goal. Second, the necessity of designing and inventorying endless shapes for anti-theft devices housings make the latter solution obviously impractical.

There are other disadvantages to prior art anti-theft devices aside from attachment issues. For example, electronic anti-theft systems have the disadvantage of not being universally mountable on cameras made by all manufacturers while cable tether anti-theft systems can be defeated by simply severing the cable.

It is, therefore, an object of the present invention to provide a universal camera mount that obviates the need to inventory many variations of mount to accommodate the varying camera shapes available for sale.

Another object of the present invention is to simplify the installation of an anti-theft monitoring device to a camera being monitored.

Another object of the present invention is to provide a means to permit consumers to handle cameras on display for sale while simultaneously preventing theft of the handled camera.

These and other objects of the invention will become apparent via the following specifications and claims.

SUMMARY OF THE INVENTION

The present invention overcomes the disadvantages of prior art anti-theft devices by incorporating an electronic anti-theft assembly in combination with a universally mountable member. The electronic anti-theft assembly would ordinarily mount directly to the product being monitored, via securement to a universally mountable mounting member. The universally mountable mounting member together with the electronic anti-theft assembly, known collectively as a universal camera mount assembly, may then be secured to a camera by a fastener threaded into the camera's pre-existing tripod mount hole, since the majority of, if not all, cameras manufactured in the world today incorporate tripod mount holes.

In the preferred embodiment, a universal camera mount assembly is employed for operably connecting an anti-theft device in one of a plurality of orientations to a camera having a threaded tripod mount hole. The universal camera mount assembly comprises a mounting member for bringing an anti-theft sensor assembly in operable contact with the camera being monitored. The mounting member itself includes an upper surface and a lower surface through which a plurality of apertures for enabling adjustable attachment of the mounting member to the camera being monitored extend. The mounting member also contains a sensor region for fixedly attaching an anti-theft sensor assembly to the mounting member to enable operable contact of the sensor with the camera being monitored. An anti-theft sensor assembly is then fixedly attached to the mounting member at the sensor region to, in turn, detect tampering with the camera being so monitored.

The plurality of apertures in the mounting member include at least three apertures where at least one of the apertures are not in linear alignment with at the least two other apertures. The at least three apertures extend from the upper surface to the lower surface of the mounting member so as to permit a portion of a first fastener to pass therethrough, for restrainable yet reorientable attachment of the mounting member and the anti-theft sensor assembly to the camera being monitored. The reorientable attachment extends into at least two substantially intersecting directions of movement to optimize the restrained positioning of the camera being monitored along the mounting member for mounting the anti-theft sensor assembly, in at least one preferred attachment position.

Preferably, the plurality of apertures in the mounting member includes a two dimensional array of at least two rows of apertures and at least two columns of apertures. Furthermore, the mounting member in the preferred embodiment is fixedly attachable to the camera being monitored using a first fastener to secure the mounting member to the camera by mated cooperation between the threaded tripod mount hole provided in the camera and the threaded portion of the first fastener. A secondary fastening device is preferably employed to also fasten the mounting member to the camera being monitored. The secondary fastening device may be double-sided adhesive member made of a substantially resilient and flexible material for restrainable affixing of the mounting member to the camera being monitored.

In the preferred embodiment, the anti-theft sensor assembly is composed of a housing having an interior region and an upper surface. The housing is configured to enable the anti-theft sensor assembly to be fixedly attached to the sensor region on the mounting member. The anti-theft sensor assembly includes a switch member for contacting the camera being monitored and is oriented substantially normal to an external surface on the camera. The housing contains an electronic circuit board for creating an electronic alarm signal upon interruption of the operable contact between the switch member and the surface of the camera being monitored. A signaling device indicates at least one of the presence and absence of operable, monitored contact between the switch member and the surface of the camera being monitored. A signal transmission medium is used for transmitting the electronic alarm signal from the electronic circuit board to an alarm signaling device.

The anti-theft sensor assembly in the preferred embodiment is fixedly attached to the sensor region on the mounting member using double-sided adhesive tape made of a substantially resilient and flexible material positioned between the sensor housing and the mounting member. The switch member of the anti-theft sensor assembly is biased into operable contact with the external surface of the camera being monitored.

In an alternative preferred embodiment, a universal camera mount assembly is employed for operably connecting an anti-theft device in one of a plurality of orientations to a camera having a threaded tripod mount hole. The universal camera mount assembly comprises a mounting member for carrying an anti-theft sensor assembly in operable contact with the camera being monitored. The mounting member itself includes an upper surface, a lower surface, a first plurality of holes and a second plurality of holes for enabling adjustable attachment of the mounting member to the camera being monitored, and further includes a sensor region with a first threaded hole for fixedly attaching an anti-theft sensor assembly to the mounting member to enable operable contact with the camera being monitored. An anti-theft sensor assembly is fixedly attached to the mounting member at the sensor region for contacting the camera being monitored to, in turn, detect tampering with the camera being so monitored.

The first plurality of apertures are arranged in a first aperture region and the second plurality of apertures are arranged in a second aperture region. The first aperture region is located adjacent to the sensor region on one side thereof and the second aperture region is located adjacent to the sensor region on the other side thereof. The first aperture region is arranged substantially opposite to the second aperture region along the mounting member. The first plurality of apertures in the mounting member further includes at least three first apertures with at least one of the at least three first apertures not in linear alignment with at least two of the other at least three first apertures. Likewise, the second plurality of apertures in the mounting member further comprising at least three second apertures with at least one of the at least three second apertures not in linear alignment with at least two of the other at least three second apertures. The at least three first apertures extending from the upper surface through to the lower surface of the mounting member to permit a threaded portion of a second fastener to pass therethrough, for restrainable, yet reorientable attachment of the mounting member and the anti-theft sensor assembly to the camera being monitored. Likewise, the at least three second apertures extend from the upper surface through to the lower surface of the mounting member to permit a threaded portion of a second fastener to pass therethrough, for restrainable, yet reorientable attachment of the mounting member and the anti-theft sensor assembly to the camera being monitored. The reorientable attachment extending into at least two substantially intersecting directions of movement amongst each of the first and second aperture regions so as to optimize the restrained positioning of the camera along the mounting member for monitoring by the anti-theft sensor, in at least one preferred attachment position in at least one of the first and second aperture regions.

Preferably, the first plurality of apertures and the second plurality of apertures on the mounting member each includes a two dimensional array of at least two rows of apertures and at least two columns of apertures. In the alternative preferred embodiment, the mounting member is fixedly attachable to the camera being monitored using a second fastener to secure the mounting member to the camera being monitored by mated cooperation between the threaded tripod mount hole provided in the camera and the threaded portion of the first fastener. A secondary fastening device is employed to secondarily fasten the mounting member to the camera being monitored. The secondary fastening device comprises a double-sided adhesive member made of a substantially resilient and flexible material for restrainable affixing of the mounting member to the camera being monitored.

In the alternative preferred embodiment, the anti-theft sensor assembly includes a switch member for contacting the camera being monitored and is oriented substantially normal to an external surface on the camera. Also included in the anti-theft sensor assembly is an electronic circuit board for creating an electronic alarm signal upon interruption of the operable contact between the switch member and the surface of the camera being monitored. A signaling device, indicates the presence and absence of operable monitored contact between the switch member and the surface of the camera being. monitored. A signal transmission medium is used for transmitting the electronic alarm signal from the electronic circuit board to an alarm signaling device. A second threaded fastener adapted to mate with the first threaded hole in the mounting member to secure the electronic circuit board to the mounting member. Preferably, the switch member of the anti-theft sensor assembly is biased into operable contact with the external surface of the camera being monitored.

DETAILED DESCRIPTION OF THE DRAWINGS

Figure 4:
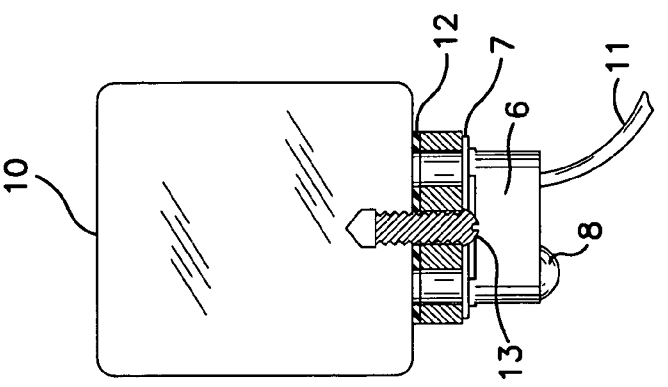
FIG. 4 is a cross-sectional view taken along site lines 4—4 of FIG. 2, and looking in the direction of the arrows, showing a typical mounting scheme of the universal mount assembly once attached to a camera being monitored.

While this invention is susceptible of embodiment in many different forms, there are shown in the drawings and will be described in detail herein, several specific embodiments with the understanding that the present invention is to be considered as an exemplification of the principles of the invention and is not intended to limit the invention to the embodiments illustrated.

Figure 1:
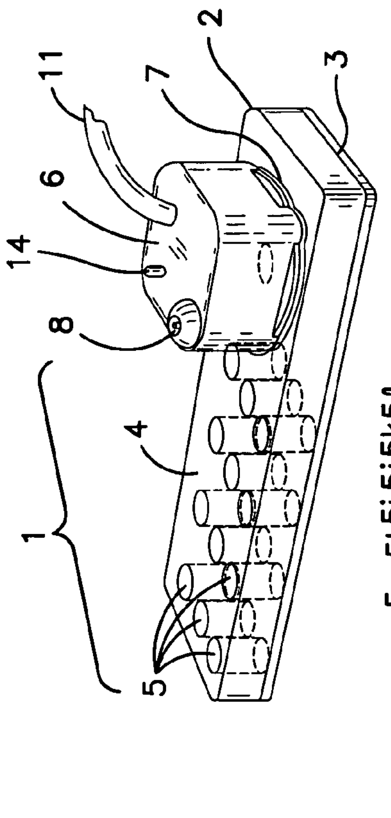
FIG. 1 is a perspective view primarily of the lower surface of a preferred embodiment of the universal mount assembly with asymmetric placement of the camera mounting holes relative to the placement of the anti-theft sensor assembly.
Figure 2:
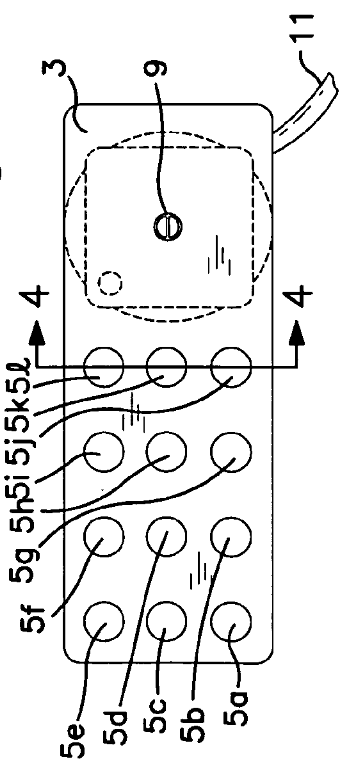
FIG. 2 is a top plan view of the apparatus of FIG. 1 showing the upper surface of a preferred embodiment of the universal mount assembly.
Figure 3:
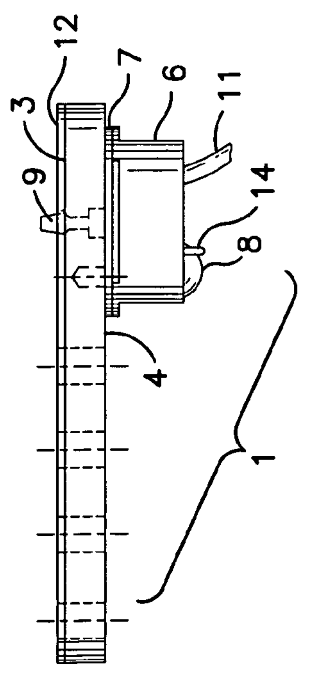
FIG. 3 is a side view of a preferred embodiment of the universal mount assembly of FIG. 1.

A preferred embodiment of a universal camera mount assembly 1 of the present invention is shown generally in FIGS. 1–4. The universal camera mount assembly 1 includes a (universally mountable) mounting member 2 having an upper surface 3 and a lower surface 4. The mounting member has a plurality of at least three mounting holes 5 (indicated in FIG. 2 as 5*a*–5*l*) that pass completely through the mounting member 2 beginning from the upper surface to the lower surface. The mounting holes 5 are oriented in any quantity of three or greater and in any pattern, but are shown in FIGS. 1–3 as being oriented in linear rows and columns. The mounting member 2 has accommodations for placement of an electronic anti-theft sensor assembly 6 adjacent to the placement of the array of mounting holes 4 holes 5 such that the array of mounting holes 5 is asymmetrically located with respect to the placement of the electronic anti-theft sensor assembly 6.

Figure 9:
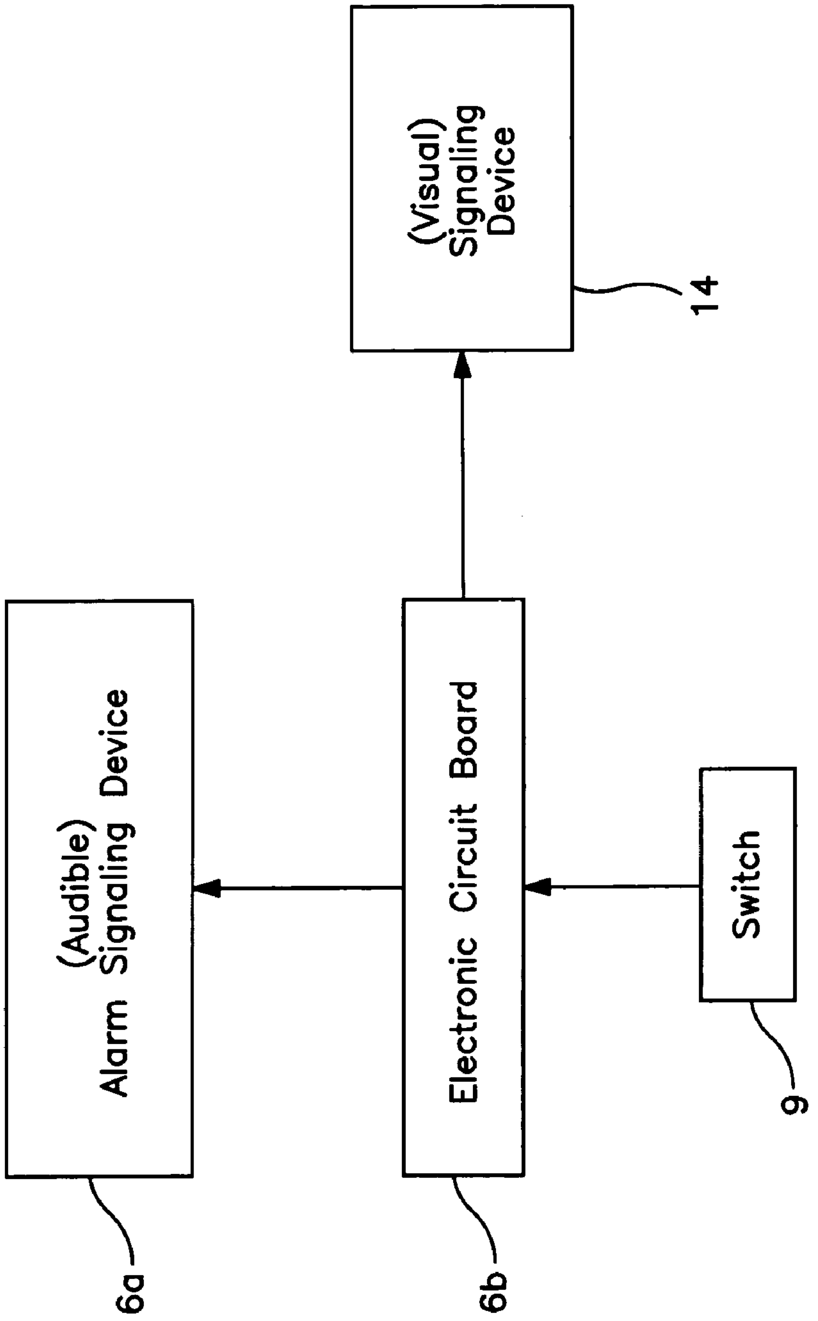
FIG. 9 is a schematic illustration of a circuit board for use in a preferred embodiment of the invention.

In the preferred embodiment, the electronic anti-theft sensor assembly 6 may be secured to the mounting member by way of a layer of double-sided adhesive tape 7, although any number of alternative fastening methods 8, such as rivets, screws, etc, may be employed in combination with, or in place of, the double-sided adhesive tape. The electronic anti-theft sensor assembly 6 may be positioned on any of the upper surface, the lower surface, or in recesses of the upper or lower surfaces on the mounting member 2. The electronic anti-theft sensor assembly 6 includes an electro-mechanical switch 9 to enable operable contact with the article being monitored 10, such as a video or still camera. The electro-mechanical switch 9 is biased against compression, preferably by employing a resistive spring, such that the electro-mechanical switch 9 will trigger an electrical signal if the switch is displaced a pre-determined amount from its compressed position. In this manner, an electro-mechanical switch 9 may be induced to make substantial contact with a surface of the camera being monitored 10 such that if contact is lost, an electronic signal is transmitted to an alarm signaling device 6*a* (as shown in FIG. 9). The transmission of the electronic signal to an alarm signaling device 6*a* may be made utilizing by utilizing any one of a variety of classical techniques, known in the art, including via a flexible electronic cable 11, cellular or terrestrial telephonic systems, radio frequencies, infrared, electro-magnetic, and the like.

FIG. 4 represents a cross sectional view of FIG. 2 of the preferred embodiment taken along site lines "4—4" and looking in the direction of the arrows. The mounting member 2 mounted to the camera being monitored 10, is preferably also affixed to the camera by double-sided adhesive tape 12 positioned between the camera 10 and the mounting member 2. The double-sided adhesive tape 12 not only secures the mounting member 2 to the camera 10, but also creates a bond between mounting member 2 and camera 10 so as to preclude direct access to anti-theft sensor assembly 6 thereby preventing tampering with the functionality of the attached anti-theft sensor assembly 6 and its switch member 9; by limiting access to switch member 9 when in contact with camera 10. To further enhance the attachment between mounting member 2 and camera 10, a fastener 13 is inserted through one of the mounting holes 5*a*–*l* and is thereafter threaded into the pre-existing tripod mount hole that normally is present on a camera 10 to be monitored. The particular mounting hole 5*a*–*l* used is dependent upon the configuration and location of the tripod mount hole present on camera 10. A user would choose the mounting hole within mounting member 2 that provides substantial contact of the upper surface of mounting member 2 to camera 10 while still maintaining substantial contact of anti-theft sensor assembly 6 and switch member 9 with camera 10. Upon securing the mounting member 2 to the camera being monitored 10, the electro-mechanical switch of the invention 9 necessarily makes contact with an external surface of the camera thereby placing the anti-theft sensor assembly 6 in its operable position to begin detecting any detachment of the camera from the universal mount assembly. In the preferred embodiment, the electronic anti-theft sensor assembly 6 incorporates a signaling feature 14, such as a light emitting diode, to serve as a visual alert to both the thief and the store personnel that intimate contact between the electro-mechanical switch 9 and a surface of the camera has been lost if the alarm circuit has been activated. In the event of an interruption of operable contact between the electro-mechanical switch 9 and the surface of the camera being monitored 10, an electronic circuit board 6*b* housed within the electronic anti-theft sensor assembly 6 creates an electrical signal for use by the signaling device 14 and the alarm signaling device 6*a*. The electrical signal may be carried from the anti-theft sensor assembly 6 to the alarm signaling device 6*a* via a flexible electronic cable, cellular or terrestrial telephonic systems, radio frequencies, infrared, electro-magnetic, and the like.

Figure 6:
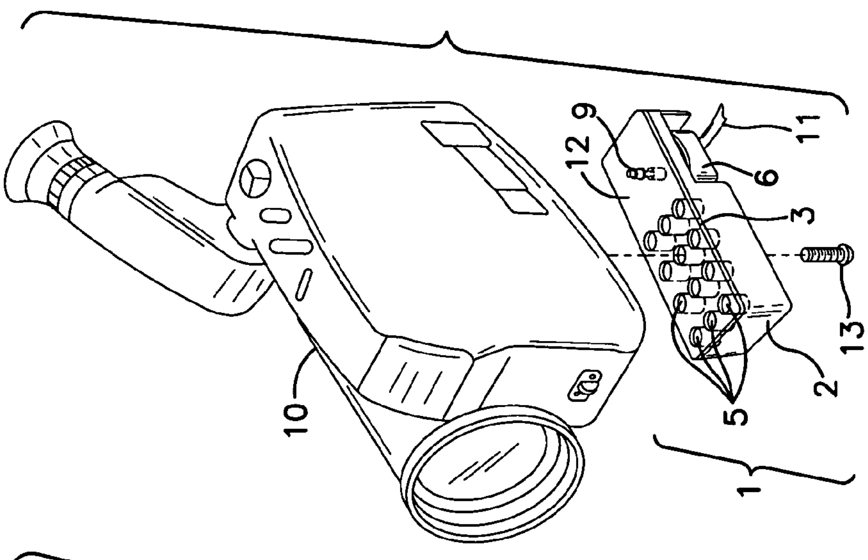
FIG. 6 is an exploded perspective view from above a camera showing a typical mounting orientation of the preferred embodiment of the universal mount assembly of FIG. 5.
Figure 5:
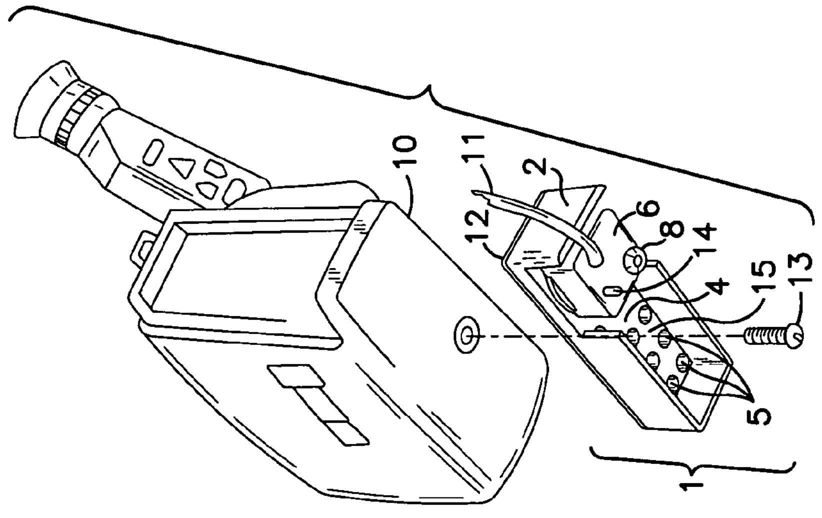
FIG. 5 is an exploded perspective view from underneath a camera showing a typical mounting orientation of the preferred embodiment of the universal mount assembly of FIG. 1 having extended sidewalls.

FIG. 5 and FIG. 6 illustrate common mounting methods of embodiments of the invention, but with alternate depictions for the universal camera mount assembly 1. The alternate embodiment shown of the universal camera mount assembly 1 in FIGS. 5 and 6 shows a recessed cavity 15 for both the mounting holes and for placement of an anti-theft sensor assembly on mounting member 2 to protect anti-theft sensor assembly 6 from handling damage. In addition, the recessed cavity 15 provides a deterrent from enabling the anti-theft sensor assembly 6 from being pried away from or off of mounting member 2.

Figure 7:
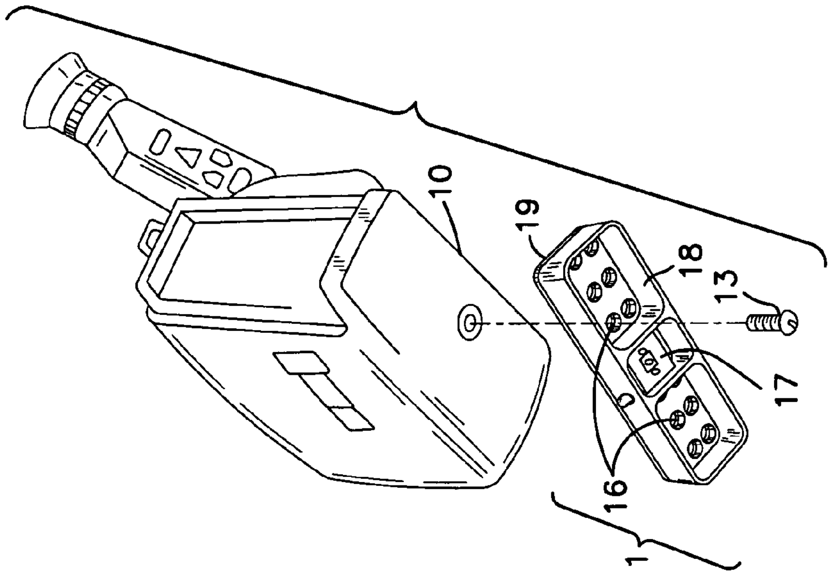
FIG. 7 is an exploded perspective view from underneath a camera showing a typical mounting orientation of an alternative preferred embodiment of the universal mount assembly with symmetric placement of two sets of mounting holes, each having two dimensions of orientation.

FIG. 7 represents an alternate embodiment showing symmetrical placement of a pair of two-dimensional arrays of mounting holes 16. In this embodiment, an electronic anti-theft sensor assembly 17 is positioned between the pair of mounting hole arrays 16. Placement of arrays of mounting holes 16 symmetrically on either side of anti-theft sensor assembly 17 permits greater flexibility in placement of mounting member 18 with respect to camera 10, while maintaining substantial and operable contact of switch member of anti-theft sensor assembly 17 to camera 10. The at least three apertures in each individual array 16 may be arranged in any geometric pattern or they be linearly ordered into rows and columns as shown, as long as at least one aperture is not in linear alignment with the other apertures that are aligned. The position of the apertures in the array on one side of the anti-theft sensor assembly 17 does not have to match or mirror the position of the apertures in the array on the other side.

The electronic anti-theft sensor assembly 17 may, as with the other embodiment, be positioned on either the upper surface, the lower surface, or in recesses of the upper or lower surfaces of the mounting member 18. This embodiment illustrates the inclusion of double-sided adhesive tape 19 as a secondary fastening means for securing the mounting member 18 to the camera being monitored 10. As in the previous embodiment, double-sided adhesive tape 19 is a secondary fastening means to the primary fastening means of fastener 13 inserted into a mounting hole within the mounting hole arrays 16. Fastener 13 would typically comprise a screw or other type of fastener known in the art.

Figure 8:
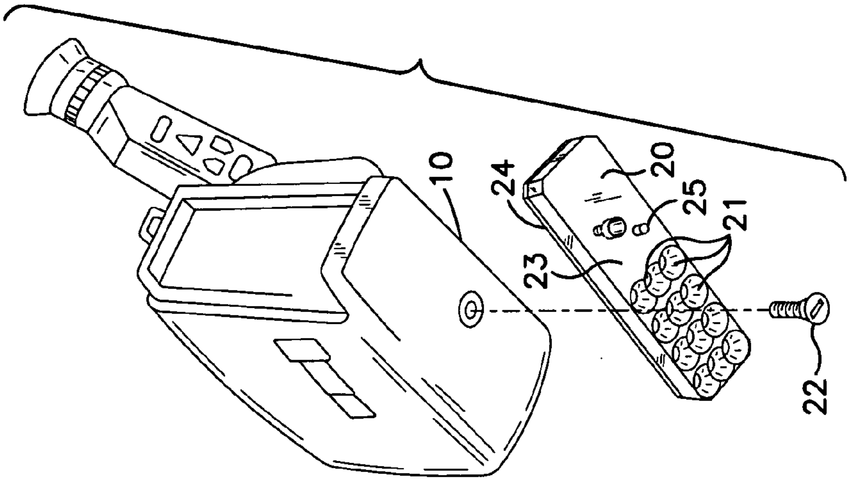
FIG. 8 is an exploded view from underneath a camera showing a typical mounting orientation of yet another alternative preferred embodiment of universal mount assembly with countersunk holes, utilizing nonsymmetrical placement of the mount holes relative to the placement of the anti-theft sensor assembly.

FIG. 8 represents yet another alternate embodiment illustrating the present invention. Mounting member 20, shown without the attendant electronic anti-theft sensor assembly, contains placement of an array of countersunk mounting holes 21 that is nonsymmetrical with respect to the position of an electronic anti-theft sensor assembly. An array of countersunk holes 21 enable the use of countersunk fastener 22 to provide for a flush appearance of fastener 22 with respect to the lower surface 23 of the mounting member 20. As in the other embodiments, double-sided adhesive tape 24, is again shown as a secondary fastening means for securing mounting member 20 to camera 10 with primary securement being effectuated by fastener 22. Fastener hole 25 in mounting member 20 is for attachment of the anti-theft sensor assembly (not shown) by typical attachment methods known in the art, such as screws, rivets and the like.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. A universal mount assembly for operably connecting an anti-theft device in one of a plurality of orientations to an article being monitored, said article being monitored including a threaded mounting aperture, the universal mount assembly comprising:

a mounting member for bringing an anti-theft sensor assembly in operable contact with the article being monitored;

the mounting member including an upper surface describing an article attachment region, a lower surface, a plurality of apertures for enabling restrainable and adjustable affixation of the mounting member to the article being monitored at said article attachment region, and further including a dedicated sensor region distinct from said article attachment region for fixedly attaching an anti-theft sensor assembly to the mounting member to enable operable contact with the article being monitored;

the mounting member being sized relative to the article being monitored, and operably configured to facilitate the manual handling, inspection and demonstration of the article;

an anti-theft sensor assembly fixedly attached to the mounting member at the sensor region for contacting the article being monitored to, in turn, detect tampering with the article being so monitored;

said plurality of apertures in the mounting member further comprising at least three apertures with at least one of the at least three apertures not in linear alignment with at least two of the other at least three apertures, each of the at least three apertures being non-threaded;

the at least three apertures extending from the upper surface to the lower surface of the mounting member to permit a threaded portion of a first fastener to pass therethrough into the threaded mounting aperture of the article being monitored, for restrainable yet reorientable affixation of the mounting member and the anti-theft sensor assembly to the article being monitored;

said reorientable affixation extending into at least two substantially intersecting directions of movement to optimize the restrained positioning of said article being monitored along said mounting member for mounting said anti-theft sensor assembly, in at least one preferred attachment position;

said sensor region positioned on the mounting member in a position laterally displaced from, and independent from, said plurality of apertures used to secure the mounting member to the article being monitored, said sensor region including an isolated aperture, displaced and segregated from said plurality of apertures in said article attachment region, for enabling passage therethrough of a switch member.

2. The universal mount assembly according to claim 1 wherein the plurality of apertures in the mounting member includes a two dimensional array of at least two rows of apertures and at least two columns of apertures.

3. The universal mount assembly according to claim 1 wherein the mounting member is fixedly attachable to the article being monitored through said first fastener, said first fastener thereby securing the mounting member to the article being monitored by mated cooperation between said threaded mounting aperture provided in the article being monitored and said threaded portion of said first fastener.

4. The universal mount assembly according to claim 1 wherein a secondary fastening device is employed to secondarily fasten the mounting member to the article being monitored.

5. The universal mount assembly according to claim 4 wherein the secondary fastening device comprises a double-sided adhesive member for restrainable affixing of said mounting member to the article being monitored.

6. The universal mount assembly according to claim 5 wherein the secondary fastening device is made of a substantially resilient and flexible material.

7. The universal mount assembly according to claim 1 wherein the anti-theft sensor assembly comprises:

a housing having an interior region and an upper surface, the housing being configured to enable the anti-theft sensor assembly to be fixedly attached to the sensor region on the mounting member;

a switch member for contacting the article being monitored, the switch member being oriented substantially normal to an external surface on the article being monitored;

an electronic circuit board contained within the interior region of the housing, the electronic circuit board creating an electrical signal upon interruption of the operable contact between the switch member and the surface of the article being monitored;

a signal for indicating one of the presence and absence of operable monitored contact between the switch member and the surface of the article being monitored;

a signal transmission medium for transmitting the electrical signal to an alarm signaling device.

8. The universal mount assembly according to claim 7 wherein the anti-theft sensor assembly is fixedly attached to the sensor region on the mounting member using a double-sided adhesive member positioned between the anti-theft sensor housing and the mounting member.

9. The universal mount assembly according to claim 8 wherein said double-sided adhesive member is made of a substantially resilient and flexible material.

10. The universal mount assembly according to claim 7 wherein the switch member is biased into operable contact with the external surface of the article being monitored.

11. The universal mount assembly according to claim 1, wherein the sensor region includes a recessed area for receiving the anti-theft sensor assembly.

12. A universal mount assembly for operably connecting an anti-theft device in one of a plurality of orientations to an article being monitored, said article being monitored including a threaded mounting aperture, the universal mount assembly comprising:

a mounting member for bringing an anti-theft sensor assembly in operable contact with the article being monitored;

the mounting member including an upper surface describing an article attachment region, a lower surface, a first plurality of apertures and a second plurality of apertures for enabling restrainable and adjustable affixation of the mounting member to the article being monitored at said article attachment region, and further including a dedicated sensor region distinct from said article attachment region with a first threaded aperture for fixedly attaching an anti-theft sensor assembly to the mounting member to enable operable contact with the article being monitored;

the mounting member being sized relative to the article being monitored, and operably configured to facilitate the manual handling, inspection and demonstration of the article;

an anti-theft sensor assembly fixedly attached to the mounting member at the sensor region for contacting the article being monitored to, in turn, detect tampering with the article being so monitored;

said first plurality of apertures being arranged in a first aperture region and said second plurality of apertures being arranged in a second aperture region;

said first aperture region being located adjacent to the sensor region on one side thereof, said second aperture region being located adjacent to the sensor region on the other side thereof, said first aperture region being arranged substantially opposite to the second aperture region along said mounting member;

said first plurality of apertures in the mounting member further comprising at least three first apertures with at least one of the at least three first apertures not in linear alignment with at least two of the other at least three first apertures, each of the at least three first apertures being non-threaded;

said second plurality of apertures in the mounting member further comprising at least three second apertures with at least one of the at least three second apertures not in linear alignment with at least two of the other at least three second apertures, said at least three second apertures being non-threaded;

the at least three first apertures extending from the upper surface to the lower surface of the mounting member to permit a threaded portion of a first fastener to pass therethrough into the threaded mounting aperture of the article being monitored, for restrainable yet reorientable affixation of the mounting member and the anti-theft sensor assembly to the article being monitored via said threaded mounting aperture;

the at least three second apertures extending from the upper surface to the lower surface of the mounting member to permit a threaded portion of a first fastener to pass therethrough, for restrainable yet reorientable affixation of the mounting member and the anti-theft sensor assembly to the article being monitored via said threaded mounting aperture;

said reorientable affixation extending into at least two substantially intersecting directions of movement amongst each of said first and second aperture regions to optimize the restrained positioning of said article along said mounting member for monitoring by said anti-theft sensor, in at least one preferred attachment position in at least one of said first and second aperture regions;

said sensor region positioned on the mounting member in a position laterally displaced from, and independent from, said plurality of apertures used to secure the mounting member to the article being monitored, said sensor region including an isolated aperture, displaced and segregated from said plurality of apertures in said article attachment region, for enabling passage therethrough of a switch member.

13. The universal mount assembly according to claim 12 wherein the first plurality of apertures and the second plurality of apertures on the mounting member each includes a two dimensional array of at least two rows of apertures and at least two columns of apertures.

14. The universal mount assembly according to claim 12 wherein the mounting member is fixedly attachable to the article being monitored through said second fastener, said second fastener thereby securing the mounting member to the article being monitored by mated cooperation between said threaded mounting aperture provided in the article being monitored and said threaded portion of said first fastener.

15. The universal mount assembly according to claim 12 wherein a secondary fastening device is employed to secondarily fasten the mounting member to the article being monitored.

16. The universal mount assembly according to claim 15 wherein the secondary fastening device comprises a double-sided adhesive member.

17. The universal mount assembly according to claim 15 wherein the secondary fastening device is made of a substantially resilient and flexible material.

18. The universal mount assembly according to claim 12 wherein the anti-theft sensor assembly is comprised of:

a switch member usable for contacting with the article being monitored, the switch member being oriented substantially normal to an external surface on the article being monitored;

an electronic circuit board creating an electrical signal upon interruption of the operable contact between the switch member and the surface of the article being monitored;

a signal for indicating the presence and absence of operable monitored contact between the switch member and the surface of the article being monitored;

a signal transmission medium for transmitting the electrical signal to an alarm signaling device;

a third fastener having a threaded shank, the shank being adapted to mate with the at least one aperture in the mounting member.

19. The universal mount assembly according to claim 18 wherein the switch member is biased into operable contact with the external surface of the article being monitored.

20. The universal mount assembly according to claim 12, wherein the sensor region includes a recessed area for receiving the anti-theft sensor assembly.

* * * * *